(No Model.)

W. H. TOWNSEND.
DEVICE FOR THINNING THE BACKS OF BAND SAWS.

No. 304,472. Patented Sept. 2, 1884.

UNITED STATES PATENT OFFICE.

WILLIAM H. TOWNSEND, OF GRAND RAPIDS, MICHIGAN, ASSIGNOR OF ONE-HALF TO JOHN NICHOLLS, OF CHICAGO, ILLINOIS.

DEVICE FOR THINNING THE BACKS OF BAND-SAWS.

SPECIFICATION forming part of Letters Patent No. 304,472, dated September 2, 1884.

Application filed January 18, 1884. (No model.)

*To all whom it may concern:*

Be it known that I, WILLIAM H. TOWNSEND, of the city of Grand Rapids, Kent county, Michigan, a citizen of the United States, have invented a new and useful Improvement in Cutters for Dressing the Backs of Band-Saws, of which the following is a specification, reference being had to the accompanying drawings.

My invention relates to the construction of an implement designed to be used by hand in thinning the backs of band-saws by shaving or scraping off a portion of the sides of the saw near the back, so as to reduce the size thereof to any dimensions required for fine scroll-sawing, and is designed to be operated by holding the same firmly upon the saw-table and applying it to the back of the saw while the saw is under a slow motion.

Figure 1:
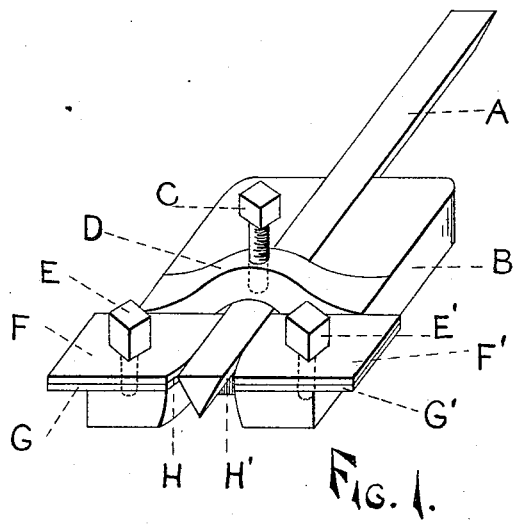
Figure 2:
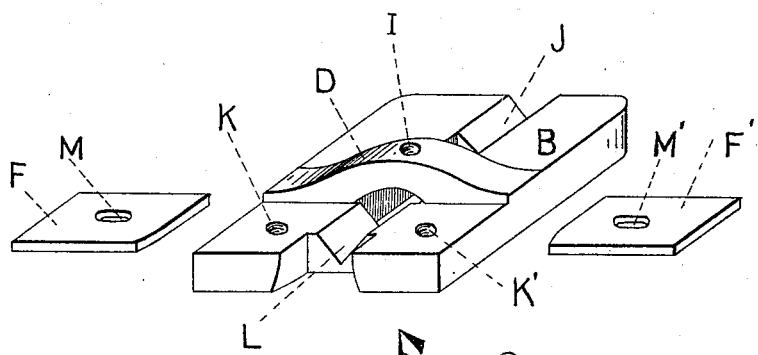

Referring to the drawings, Figure 1 is a perspective view of my implement complete. Fig. 2 shows detached parts.

Similar letters of reference refer to corresponding parts throughout both figures.

B, Fig. 2, represents the frame, of iron or other suitable material, and of convenient size, preferably about two and one-half by three and one-half inches square and five-eighths of an inch deep, and having the triangular groove J and the bridge or arch D. The part B consists, preferably, of a single solid piece or casting, having the holes K, K', and I, through which pass the set-screws hereinafter described. F and F', Fig. 2, are adjustable guides, having slots *m* and *m'*.

In Fig. 1, A represents the cutter, being a triangular prism, of hardened steel or other suitable material, having three cutting-edges. It is secured in the groove J and passes underneath the arch D, and is securely held by the set-screw C pressing down upon its top, and is adjustable by means of said set-screw.

G and G', Fig. 1, are cushions of leather, rubber, or other suitable material, and are placed beneath the adjustable guides F F', and rest upon the frame B forward of the arch. Adjustable guides F F' and cushions G G' are kept in place by set-screws E E', Fig. 1. The inner corners of the guides F F' are slightly rounded, forming, with cutter A, the notches H H', Fig. 1, and these notches are designed to receive the back of the saw to be dressed, being held as above described. The guides F F', pressing against the side of the saw, force it against the cutting-edge of cutter A, and the saw, being then given a slow motion, (by hand, preferably,) may be cut or shaved as much as desired. The edge of cutter forming notch H will shave one side and that forming notch H' the other side of the saw. Cushions G G' prevent any jarring while the work is progressing. Cutter A may be pushed through as the cutting-edges become dull, and adjusted as desired.

Having thus described my invention, what I claim as new, and desire to secure by Letters Patent, is—

1. The combination and arrangement of the parts, frame B, cutter A, cushions G G', and adjustable guides F F', as described, and for the purposes set forth.

2. Frame B, cutter A, and set-screw C, in combination with adjustable guides F and F' and set-screws E E'.

WILLIAM H. TOWNSEND.

Witnesses:
DENNIS L. ROGERS,
JAY D. NAYSMITH.